(12) United States Patent
Fujisue et al.

(10) Patent No.: US 10,468,953 B2
(45) Date of Patent: Nov. 5, 2019

(54) ELECTRIC MOTOR, COMPRESSOR, AND REFRIGERATING CYCLE APPARATUS

(71) Applicant: Mitsubishi Electric Corporation, Tokyo (JP)

(72) Inventors: Yoshikazu Fujisue, Tokyo (JP); Kazuya Kumagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 400 days.

(21) Appl. No.: 15/322,624

(22) PCT Filed: Jul. 29, 2015

(86) PCT No.: PCT/JP2015/071457
§ 371 (c)(1),
(2) Date: Dec. 28, 2016

(87) PCT Pub. No.: WO2016/031477
PCT Pub. Date: Mar. 3, 2016

(65) Prior Publication Data
US 2017/0179802 A1 Jun. 22, 2017

(30) Foreign Application Priority Data
Aug. 25, 2014 (JP) .................................. 2014-170595

(51) Int. Cl.
*H02K 21/16* (2006.01)
*H02K 21/14* (2006.01)
(Continued)

(52) U.S. Cl.
CPC ............. *H02K 21/16* (2013.01); *F25B 13/00* (2013.01); *F25B 31/026* (2013.01); *H02K 1/02* (2013.01);
(Continued)

(58) Field of Classification Search
CPC .......... H02K 21/16; H02K 1/276; H02K 1/02; H02K 1/2706; H02K 1/146; H02K 21/14;
(Continued)

(56) References Cited

U.S. PATENT DOCUMENTS 6,218,753 B1 * 4/2001 Asano .................... H02K 1/276
310/156.53
2003/0080642 A1  5/2003  Mori et al.
(Continued)

FOREIGN PATENT DOCUMENTS

CN   101552066 A   10/2009
JP   2000-209827 A   7/2000
(Continued)

OTHER PUBLICATIONS

Received STIC search report from EIC 2800 searcher Mesfin Getaneh dated Mar. 28, 2019 for last part of claim 1. (Year: 2019).*
(Continued)

*Primary Examiner* — Nguyen Tran
*Assistant Examiner* — Htet Z Kyaw
(74) *Attorney, Agent, or Firm* — Posz Law Group, PLC

(57) ABSTRACT

A stator of an electric motor (40) has windings (44) and a stator core (43) in which eighteen teeth (71), around which the windings (44) are wound, are formed circumferentially. A rotor of the electric motor (40) has magnets (72) and a rotor core (46) in which six insertion holes (73), into which the magnets (72) are inserted, are formed circumferentially. The magnets (72) are rare-earth magnets of a grain boundary diffusion type having a residual magnetic flux density Br of from 1.36 to 1.42 T. The total area of magnet-parallel cross-sections (84) of the teeth (71) is from 0.56 times to 0.93 times the total area of tooth-facing surfaces (83) of the magnets (72).

18 Claims, 7 Drawing Sheets

(51) Int. Cl.
*F25B 13/00* (2006.01)
*F25B 31/02* (2006.01)
*H02K 1/02* (2006.01)
*H02K 1/14* (2006.01)
*H02K 1/27* (2006.01)

(52) U.S. Cl.
CPC ........... *H02K 1/146* (2013.01); *H02K 1/2706* (2013.01); *H02K 1/276* (2013.01); *H02K 21/14* (2013.01); *F25B 2400/07* (2013.01); *H02K 2213/03* (2013.01)

(58) Field of Classification Search
CPC ........ H02K 2213/03; H02K 1/00; H02K 1/06; H02K 1/148; H02K 3/47; H02K 1/12; H02K 1/185; H02K 1/187; F25B 31/026; F25B 13/00; F25B 2400/07
USPC ..................................................... 310/156.11
See application file for complete search history.

(56) References Cited

U.S. PATENT DOCUMENTS

| | | | | | |
|---|---|---|---|---|---|
| 2005/0035677 | A1* | 2/2005 | Evans | ...................... | H02K 1/02 310/156.35 |
| 2005/0134133 | A1 | 6/2005 | Mori et al. | | |
| 2005/0134134 | A1 | 6/2005 | Mori et al. | | |
| 2009/0224615 | A1 | 9/2009 | Komuro et al. | | |
| 2009/0251023 | A1 | 10/2009 | Nakano et al. | | |
| 2010/0117477 | A1* | 5/2010 | Yoshino | .................. | H02K 1/276 310/156.53 |
| 2010/0119390 | A1* | 5/2010 | Baba | ...................... | H02K 1/276 417/423.7 |
| 2011/0254402 | A1* | 10/2011 | Suzuki | ................... | H02K 1/146 310/216.094 |
| 2012/0060547 | A1* | 3/2012 | Fujisue | ................... | F04B 35/04 62/498 |
| 2012/0159983 | A1* | 6/2012 | Tsutsumi | ............. | H02K 17/205 62/498 |
| 2014/0077653 | A1* | 3/2014 | Takahashi | ............ | H02K 1/2766 310/156.53 |
| 2016/0301270 | A1* | 10/2016 | Ota | ........................ | H02K 21/16 |

FOREIGN PATENT DOCUMENTS

| | | |
|---|---|---|
| JP | 2003-079084 A | 3/2003 |
| JP | 2004-088905 A | 3/2004 |
| JP | 2009-183069 A | 8/2009 |
| JP | 2009-254103 A | 10/2009 |
| JP | 2010-154672 A | 7/2010 |
| JP | 2012-217251 A | 11/2012 |
| JP | 2013-093956 A | 5/2013 |
| JP | 2014-054155 A | 3/2014 |
| JP | 2014-082933 A | 5/2014 |

OTHER PUBLICATIONS

Received STIC search report from EIC 2800 searcher Mesfin Getaneh dated Nov. 23, 2018 for first part of claim 1. (Year: 2018).*
Office Action dated Nov. 7, 2017 issued in corresponding JP patent application No. 2016-545397 (and English translation).
Office Action dated May 30, 2017 issued in corresponding JP patent application No. 2016-545397 (and English translation).
Office Action dated Jun. 22, 2018 issued in corresponding CN patent application No. 201580045568.8 (and English translation).
International Search Report of the International Searching Authority dated Oct. 27, 2015 for the corresponding international application No. PCT/JP2015/071457 (and English translation).

* cited by examiner

ELECTRIC MOTOR, COMPRESSOR, AND REFRIGERATING CYCLE APPARATUS

CROSS REFERENCE TO RELATED APPLICATIONS

This application is a U.S. national stage application of PCT/JP2015/071457 filed on Jul. 29, 2015, and is based on Japanese Patent Application No. 2014-170595 filed on Aug. 25, 2014, the disclosures of which are incorporated herein by reference.

TECHNICAL FIELD

The present invention relates to an electric motor, a compressor, and a refrigerating cycle apparatus. The present invention relates, for example, to an electric motor in which high-Br magnets having a high residual magnetic flux density Br are mounted on a rotor, and which is used in various industrial fields.

BACKGROUND ART

To realize a compact and high-power electric motor, the use of high-Br magnets having a high residual magnetic flux density Br is effective. However, the electric motor using the high-Br magnets has a tendency to have a high magnetic flux density in its core, so that magnetic saturation is more likely to occur.

The occurrence of magnetic saturation leads to an increase in iron loss, causing motor efficiency to be reduced. Due to the occurrence of magnetic saturation, spatial harmonics and temporal harmonics increase in a magnetic flux density distribution, so that torque pulsation increases.

As a method for reducing the increase in iron loss due to magnetic saturation and reducing the torque pulsation due to the increased spatial harmonics and temporal harmonics, there is a method by which magnetic flux-weakening control is performed in an operating region in which a power supply voltage applied to armature windings becomes larger than the sum of a no-load induced voltage and an armature reaction voltage (see Patent Literature 1, for example).

CITATION LIST

Patent Literature

Patent Literature 1: JP 2004-88905 A

SUMMARY OF INVENTION

Technical Problem

It is desired to realize a high-efficiency electric motor in which magnetic saturation is less likely to occur even if high-Br magnets having a high residual magnetic flux density are used, regardless of whether or not magnetic-flux weakening control is performed.

Since the high-Br magnets are prone to demagnetization, it is necessary to realize an electric motor in which demagnetization is less likely to occur even if the high-Br magnets are used.

It is an object of the present invention, for example, to obtain a configuration of an electric motor in which demagnetization is less likely to occur even if magnets with a high residual magnetic flux density are used.

Solution to Problem

An electric motor according to one aspect of the present invention includes:

a rotor having magnets of a grain boundary diffusion type and a rotor core in which insertion holes, into which the magnets are inserted, are formed circumferentially; and a stator having windings and a stator core in which teeth, around which the windings are wound, are formed circumferentially, wherein in a state in which a center of one of the magnets and a center of one of the teeth are aligned along a radial direction of the rotor core, a surface of the one of the magnets, the surface facing the one f the teeth, is defined as a tooth-facing surface, and a cross-section of a portion of the one of the teeth where one or more of the windings are wound, the cross-section being parallel to the tooth-facing surface, is defined as a magnet-parallel cross-section, and a total area of magnet-parallel cross-sections of the teeth formed in the stator core is from 0.56 times to 0.93 times a total area of tooth-facing surfaces of the magnets inserted into the insertion holes formed in the rotor core.

Advantageous Effects of Invention

In the present invention, the total area of cross-sections of teeth formed in a stator core of an electric motor is from 0.56 times to 0.93 times the total area of surfaces of magnets inserted into insertion holes formed in a rotor core of the electric motor, so that it is possible to realize the electric motor in which demagnetization is less likely to occur.

DESCRIPTION OF EMBODIMENTS

Figure 1:
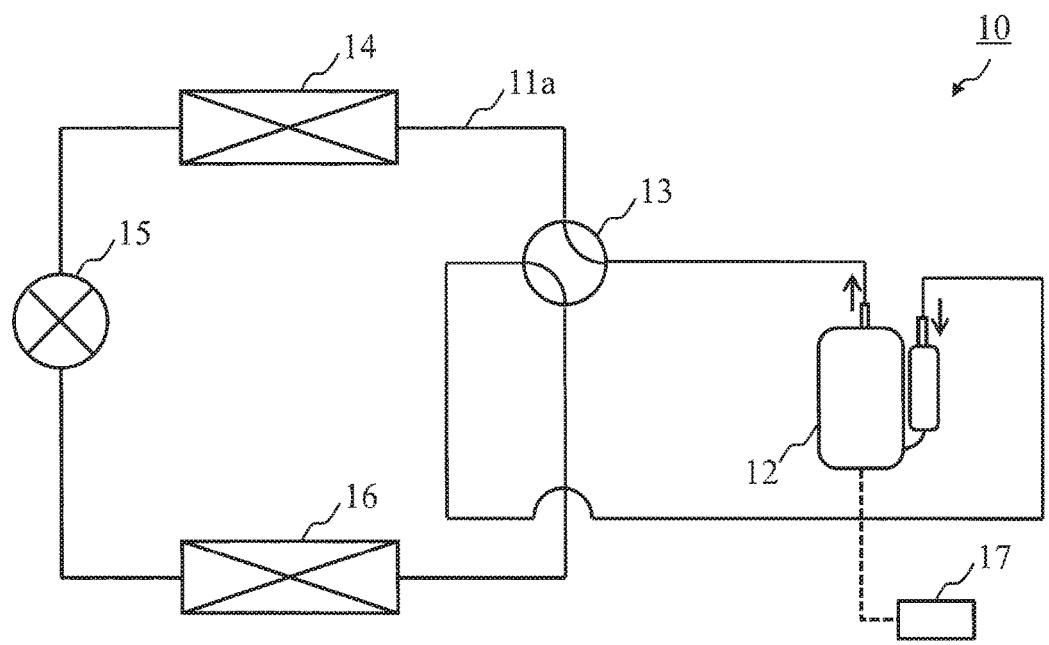
FIG. 1 is a circuit diagram of a refrigerating cycle apparatus (in a cooling operation) according to an embodiment of the present invention.

An embodiment of the present invention will now be described with reference to the drawings. The same or equivalent portions are denoted by the same reference numerals throughout the drawings. In the description of the embodiment, explanations of the same or equivalent portions will be suitably omitted or simplified. Concerning the configurations of devices, instruments, components, and the like, their materials, shapes, sizes, and the like can be appropriately changed within the scope of the present invention.

First Embodiment

Figure 2:
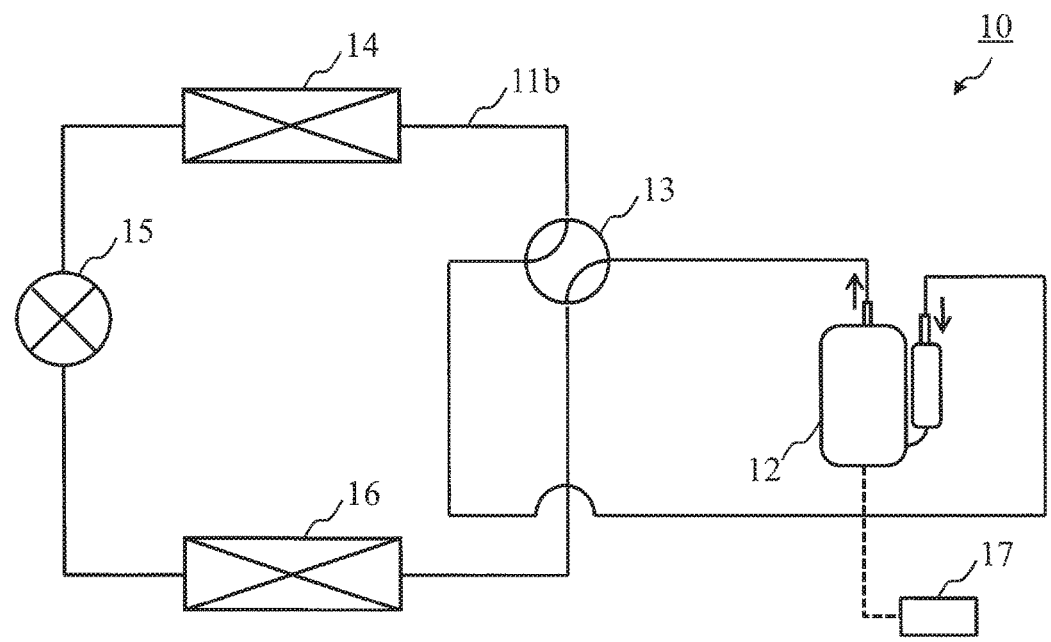
FIG. 2 is a circuit diagram of the refrigerating cycle apparatus (in a heating operation) according to the embodiment of the present invention.

FIGS. 1 and 2 are circuit diagrams of a refrigerating cycle apparatus 10 according to this embodiment. FIG. 1 illustrates a refrigerant circuit 11a in a cooling operation. FIG. 2 illustrates a refrigerant circuit 11b in a heating operation.

In this embodiment, the refrigerating cycle apparatus 10 is an air conditioner. This embodiment can also be applied if the refrigerating cycle apparatus 10 is an appliance other than an air conditioner (e.g., a heat pump cycle apparatus).

As illustrated in FIGS. 1 and 2, the refrigerating cycle apparatus 10 includes the refrigerant circuit 11a or 11b in which a refrigerant circulates.

A compressor 12, a four-way valve 13, an outdoor heat exchanger 14, an expansion valve 15, and an indoor heat exchanger 16 are connected to the refrigerant circuit 11a or 11b. The compressor 12 compresses the refrigerant. The four-way valve 13 switches between the flowing directions of the refrigerant in the cooling operation and in the heating operation. The outdoor heat exchanger 14 is an example of a first heat exchanger. In the cooling operation, the outdoor heat exchanger 14 operates as a condenser to dissipate heat of the refrigerant compressed by the compressor 12. In the heating operation, the outdoor heat exchanger 14 operates as an evaporator to heat the refrigerant by exchanging heat between outdoor air and the refrigerant expanded at the expansion valve 15. The expansion valve 15 is an example of an expansion mechanism. The expansion valve 15 expands the refrigerant heat of which has been dissipated at the condenser. The indoor heat exchanger 16 is an example of a second heat exchanger. In the heating operation, the indoor heat exchanger 16 operates as a condenser to dissipate heat of the refrigerant compressed by the compressor 12. In the cooling operation, the indoor heat exchanger 16 operates as an evaporator to heat the refrigerant by exchanging heat between indoor air and the refrigerant expanded at the expansion valve 15.

The refrigerating cycle apparatus 10 further includes a control device 17.

The control device 17 is, for example, a microcomputer. Although the drawings illustrate only a connection between the control device 17 and the compressor 12, the control device 17 is connected not only to the compressor 12 but also to each element connected to the refrigerant circuit 11a or 11b. The control device 17 monitors and controls the state of each element.

As the refrigerant circulating in the refrigerant circuit 11a or 11b, an arbitrary refrigerant such as an R407C refrigerant, an R410A refrigerant, an R1234yf refrigerant, or an R32 refrigerant can be used.

Figure 3:
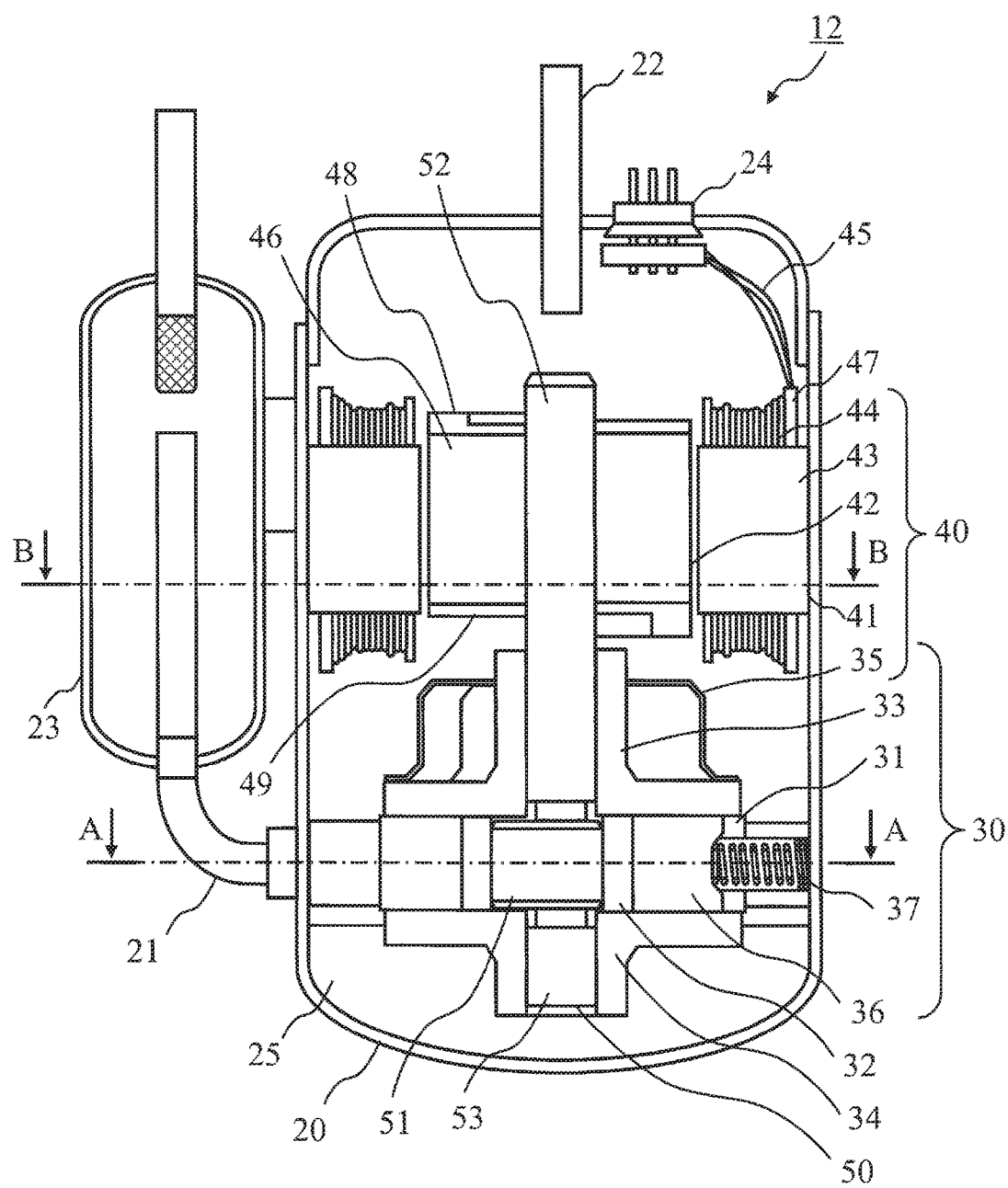
FIG. 3 is a longitudinal cross-sectional view of a compressor according to the embodiment of the present invention.
Figure 4:
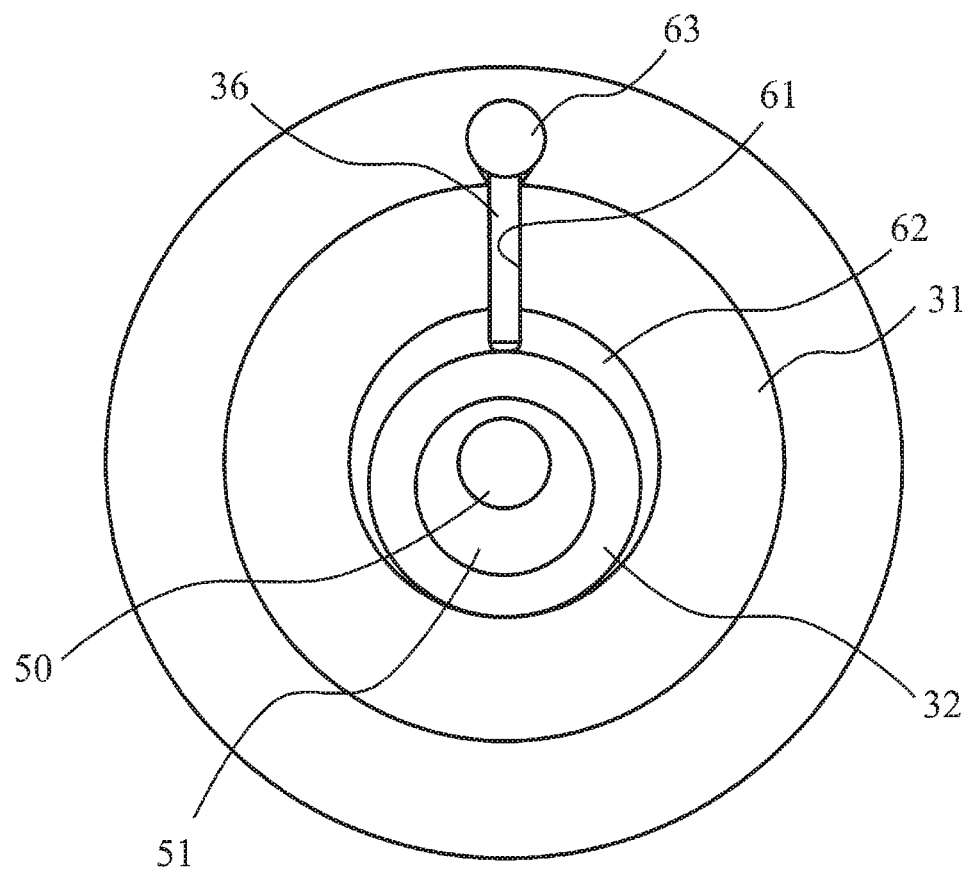
FIG. 4 is a cross-sectional view taken along the line A-A of FIG. 3.
Figure 5:
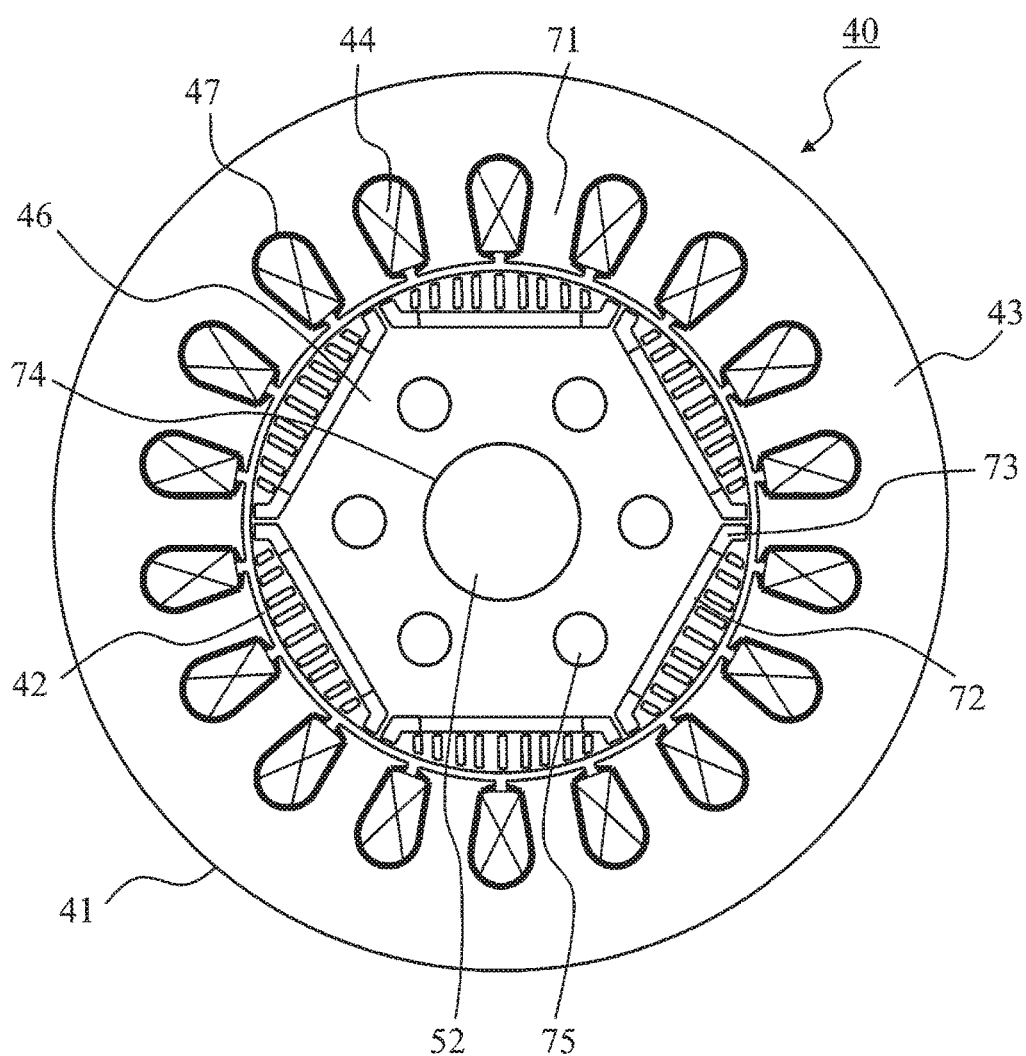
FIG. 5 is a cross-sectional view taken along the line B-B of FIG. 3.

FIG. 3 is a longitudinal cross-sectional view of the compressor 12. FIG. 4 is a cross-sectional view taken along the line A-A of FIG. 3. FIG. 5 is a cross-sectional view taken along the line B-B of FIG. 3. In each drawing, hatching that expresses a cross-section is omitted. FIGS. 4 and 5 illustrate only the inside of a hermetic container 20.

In this embodiment, the compressor 12 is a single-cylinder rotary compressor. This embodiment can also be applied if the compressor 12 is a multi-cylinder rotary compressor or a scroll compressor.

As illustrated in FIG. 3, the compressor 12 includes the hermetic container 20, a compressing element 30, an electric motor 40, and a crank shaft 50.

The hermetic container 20 is an example of a container. A suction pipe 21 to suck the refrigerant and a discharge pipe 22 to discharge the refrigerant are attached to the hermetic container 20.

The compressing element 30 is accommodated in the hermetic container 20. Specifically, the compressing element 30 is placed at a lower portion of the inside of the hermetic container 20. The compressing element 30 compresses the refrigerant sucked into the suction pipe 21.

The electric motor 40 is also accommodated in the hermetic container 20. Specifically, the electric motor 40 is placed, in the hermetic container 20, at a position where the refrigerant compressed by the compressing element 30 passes before being discharged from the discharge pipe 22. That is, the electric motor 40 is placed above the compressing element 30 inside the hermetic container 20. The electric motor 40 drives the compressing element 30.

Refrigerating machine oil 25 for lubricating each sliding portion of the compressing element 30 is reserved at the bottom portion of the hermetic container 20. Along with the rotation of the crank shaft 50, the refrigerating machine oil 25 is pumped up by an oil pump (not illustrated) provided at the lower portion of the crank shaft 50 and is supplied to each sliding portion of the compressing element 30. As the refrigerating machine oil 25, for example, POE (polyol ester), PVE (polyvinyl ether), or AB (alkyl benzene), each being synthetic oil, is used.

The compressing element 30 will be described in detail hereinbelow.

As illustrated in FIGS. 3 and 4, the compressing element 30 includes a cylinder 31, a rolling piston 32, a vane 36, a main bearing 33, and an auxiliary bearing 34.

The outer circumference of the cylinder 31 has a substantially circular shape in a plan view. A cylinder chamber 62 being a space that has a substantially circular shape in a plan view is formed in the cylinder 31. Both axial ends of the cylinder 31 are open.

The cylinder 31 is provided with a vane groove 61 to communicate with the cylinder chamber 62 and extend radially. A back-pressure chamber 63, which is a space that has a substantially circular shape in a plan view and communicates with the vane groove 61, is formed at the outer side of the vane groove 61.

The cylinder 31 is provided with a suction port (not illustrated) through which a gas refrigerant is sucked from the refrigerant circuit 11a or 11b. The suction port extends from the outer circumferential surface of the cylinder 31 to penetrate into the cylinder chamber 62, The cylinder 31 is provided with a discharge port (not illustrated) through which the compressed refrigerant is discharged from the cylinder chamber 62. The discharge port is formed by notching the upper end face of the cylinder 31.

The rolling piston 32 has a ring-like shape. The rolling piston 32 moves eccentrically in the cylinder chamber 62. The rolling piston 32 slidably hits on an eccentric shaft portion 51 of the crank shaft 50.

The vane 36 has a flat and substantially rectangular parallelepiped shape. The vane 36 is placed in the vane groove 61 of the cylinder 31. The vane 36 is constantly pressed against the rolling piston 32 by a vane spring 37 provided in the back-pressure chamber 63. Because of high pressure inside the hermetic container 20, when the compressor 12 starts operation, force due to the difference between the pressure in the hermetic container 20 and the pressure in the cylinder chamber 62 acts on the rear surface (i.e., a surface at the side of the back-pressure chamber 63) of the vane 36. Therefore, the vane spring 37 is used for pressing the vane 36 against the rolling piston 32 mainly at start-up of the compressor 12 (when there is no difference between the pressure in the hermetic container 20 and the pressure in the cylinder chamber 62).

The main bearing 33 has a substantially inverted T-shape in a side view. The main bearing 33 slidably fits on a main shaft portion 52, which is a portion upper than the eccentric shaft portion 51, of the crank shaft 50. The main bearing 33 closes the upper side of the cylinder chamber 62 of the cylinder 31 and the upper side of the vane groove 61 of the cylinder 31.

The auxiliary bearing 34 has a substantially T-shape in a side view. The auxiliary bearing 34 slidably fits on an auxiliary shaft portion 53, which is a portion lower than the eccentric shaft portion 51, of the crank shaft 50. The auxiliary bearing 34 closes the lower side of the cylinder chamber 62 of the cylinder 31 and the lower side of the vane groove 61 of the cylinder 31.

The main bearing 33 includes a discharge valve (not illustrated). A discharge muffler 35 is attached to the outer side of the main bearing 33. A high-temperature and high-pressure gas refrigerant discharged through the discharge valve temporarily enters the discharge muffler 35 and is then emitted from the discharge muffler 35 to the space in the hermetic container 20. The discharge valve and the discharge muffler 35 may be provided to the auxiliary bearing 34, or both of the main bearing 33 and the auxiliary bearing 34.

The materials of the cylinder 31, the main bearing 33, and the auxiliary bearing 34 each are gray cast iron, sintered steel, carbon steel, or the like. The material of the rolling piston 32 is, for example, alloy steel containing chrome or the like. The material of the vane 36 is, for example, high-speed tool steel.

A suction muffler 23 is provided beside the hermetic container 20. The suction muffler 23 sucks a low-pressure gas refrigerant from the refrigerant circuit 11a or 11b. The suction muffler 23 inhibits direct entry of a liquid refrigerant into the cylinder chamber 62 of the cylinder 31 when the liquid refrigerant returns. The suction muffler 23 is connected to the suction port of the cylinder 31 through the suction pipe 21. The main body of the suction muffler 23 is fixed to the side surface of the hermetic container 20 by welding or the like.

The electric motor 40 will be described in detail hereinbelow.

In this embodiment, the electric motor 40 is a brushless DC (direct current) motor using high-Br magnets having a high residual magnetic flux density Br. This embodiment can also be applied if the electric motor 40 is a motor other than a brushless DC motor, provided that the motor uses high-Br magnets.

As illustrated in FIGS. 3 and 5, the electric motor 40 includes a substantially cylindrical stator 41 and a substantially columnar rotor 42.

The stator 41 is fixed in contact with the inner circumferential surface of the hermetic container 20. The rotor 42 is placed inside of and spaced approximately 0.3 to 1 mm apart from the stator 41.

The stator 41 includes a stator core 43 and windings 44. The stator core 43 is fabricated by punching electromagnetic steel plates, each of which contains iron as a major component and has a thickness of 0.1 to 1.5 mm, into a predetermined shape, laminating the punched electromagnetic steel plates axially, and fixing the laminated electromagnetic steel plates by caulking, welding, or the like. Each one or more of the windings 44 are wound around a corresponding one of eighteen teeth 71 formed in the stator core 43 via an insulating member 47 by distributed winding or concentrated winding. The teeth 71 each have a shape gradually decreasing in width from the base, with the constant width at a portion where one or more of the windings 44 are wound, and increasing in width at the distal end. When current flows in the windings 44, the teeth 71 around which the windings 44 are wound each serve as a magnetic pole. The direction of the magnetic pole is determined by the direction of the current flowing in the windings 44. The windings 44 each include a core wire and at least one-layer film covering the core wire. The material of the core wire is, for example, copper. The material of the film is, for example, AI (amide-imide)/EI (ester-imide). The material of the insulating member 47 is, for example, PET (polyethylene terephthalate), PBT (polybutylene terephthalate), FEP (tetrafluoroethylene-hexafluoropropylene copolymer), PFA (tetrafluoroethylene-perfluoroalkyl vinyl ether copolymer), PTFE (polytetrafluoroethylene), LCP (liquid-crystal polymer), PPS (polyphenylene sulfide), or phenol resin. Lead wires 45 are connected to the windings 44.

Notches may be formed on the outer circumference of the stator core 43 at substantially equal intervals circumferentially. In that case, each notch serves as one of passages for the gas refrigerant emitted from the discharge muffler 35 to the space the hermetic container 20. Each notch also serves as a passage for the refrigerating machine oil 25 returning to the bottom portion of the hermetic container 20 from above the electric motor 40.

The rotor 42 includes a rotor core 46 and magnets 72. As with the stator core 43, the rotor core 46 is fabricated by punching electromagnetic steel plates, each of which contains iron as a major component and has a thickness of 0.1 to 1.5 mm, into a predetermined shape, laminating the punched electromagnetic steel plates axially, and fixing the laminated electromagnetic steel plates by caulking, welding, or the like. Each one of the magnets 72 is inserted into a corresponding one of six insertion holes 73 formed in the rotor core 46. The magnets 72 each have a rectangular parallelepiped shape and form a magnetic pole.

As the magnets 72, those fabricated by a grain boundary diffusion method, that is, those of a grain boundary diffusion type are used. The magnets of the grain boundary diffusion type generally have a residual magnetic flux density Br of 1.3 T (teslas) or higher at ordinary temperatures (e.g., 20° C.). In this embodiment, it is assumed that such high-Br magnets are used as the magnets 72. As the magnets 72, those of a type other than the grain boundary diffusion type may be used, provided that the residual magnetic flux density Br is 1.3 T or higher.

An upper end plate 48 and a lower end plate 49 are respectively provided to the upper end and the lower end (i.e., the two axial ends) of the rotor 42, so that the magnets 72 do not fall out axially. The upper end plate 48 and the lower end plate 49 each double as a rotation balancer. The upper end plate 48 and the lower end plate 49 are fixed to the rotor core 46 with fixing rivets (not illustrated) or the like.

A shaft hole 74, into which the main shaft portion 52 of the crank shaft 50 is shrink-fitted or press-fitted, is formed at the center of the rotor core 46 in a plan view. Through holes 75 extending substantially axially are formed around the shaft hole 74 of the rotor core 46. Each through hole 75 serves as one of the passages for the gas refrigerant emitted from the discharge muffler 35 to the space in the hermetic container 20.

A terminal 24 (e.g., a glass terminal) connected to an external power supply (e.g., an inverter device) is attached to the top portion of the hermetic container 20. The terminal 24 is fixed to the hermetic container 20 by, for example, welding. The lead wires 45 extending from the electric motor 40 are connected to the terminal 24.

The discharge pipe 22, both axial ends of which are open, is attached to the top portion of the hermetic container 20. The gas refrigerant which has been discharged from the compressing element 30 is discharged from the space in the hermetic container 20 through the discharge pipe 22 to the external refrigerant circuit 11a or 11b.

The operation of the compressor 12 will be described hereinbelow.

Power supplied from the terminal 24 to the stator 41 of the electric motor 40 via the lead wires 45. Current thereby flows through the windings 44 of the stator 41, and magnetic flux is generated from the windings 44. The rotor 42 of the electric motor 40 rotates by the action of the magnetic flux generated from the windings 44 and the magnetic flux generated from the magnets 72 of the rotor 42. The rotation of the rotor 42 causes the crank shaft 50, which is fixed to the rotor 42, to rotate. Along with the rotation of the crank shaft 50, the rolling piston 32 of the compressing element 30 eccentrically rotates in the cylinder chamber 62 of the cylinder 31 of the compressing element 30. The space between the cylinder 31 and the rolling piston 32 is divided into two spaces by the vane 36 of the compressing element 30. Along with the rotation of the crank shaft 50, the volumes of the two spaces change. In one of the two spaces, as the volume gradually enlarges, the low-pressure gas refrigerant is sucked from the suction muffler 23. In the other of the two spaces, as the volume gradually reduces, the gas refrigerant inside is compressed. The compressed gas refrigerant, the pressure and the temperature of which have become high, is discharged from the discharge muffler 35 to the space in the hermetic container 20. The discharged gas refrigerant further passes through the electric motor 40 and is discharged from the discharge pipe 22 at the top portion of the hermetic container 20 to the outside of the hermetic container 20. The refrigerant discharged to the outside of the hermetic container 20 passes through the refrigerant circuit 11a or 11b to return again to the suction muffler 23.

If the compressor 12 is configured as a swing-type rotary compressor (not illustrated), the vane 36 is provided integrally with the rolling piston 32, and when the crank shaft 50 is driven, the vane 36 projects and retracts along an accepting groove in a support body rotatably attached to the rolling piston 32. Along with the rotation of the rolling piston 32, the vane 36 moves forward and backward radially while swinging, thereby partitioning the interior of the cylinder chamber 62 into a compression chamber and a suction chamber. The support body is composed of two columnar members each having a semicircular cross section. The support body is rotatably fitted in a circular holding hole formed at an intermediate portion between the suction port and the discharge port of the cylinder 31.

As the load required for each process of sucking, compressing, and discharging the refrigerant by the compressing element 30 increases, the rotational force generated by the electric motor 40, that is, generated torque needs to be increased. The magnitude of the generated torque of the electric motor 40 is determined by the magnitude of the magnetic flux generated by the current flowing in the windings 44 of the stator 41 and the magnitude of the magnetic flux generated in the magnets 72 of the rotor 42. The magnitude of the magnetic flux at the side of the rotor 42 is determined mainly by the specifications of the magnets 72 selected at the time of design. The magnitude of the magnetic flux at the side of the stator 41 is determined not only by the number of turns of the windings 44 which is set at the time of design, but also by the value of the current to the windings 44 which is set at the time of operation. At the time of operation, therefore, the generated torque of the electric motor 40 can be controlled according to the load of the compressing element 30 by controlling the current flowing in the windings 44 from the external power supply via the lead wires 45 and the terminal 24. That is, in order to increase the generated torque of the electric motor 40, the current flowing in the windings 44 is boosted. In order to decrease the generated torque of the electric motor 40, the current flowing in the windings 44 is reduced.

As described above, the electric motor 40 includes the stator 41 and the rotor 42.

The stator 41 has the windings 44 and the stator core 43 in which the eighteen teeth 71, around which the windings 44 are wound, are formed circumferentially.

The rotor 42 has the magnets 72 and the rotor core 46 in which the six insertion holes 73, into which the magnets 72 are inserted, are formed circumferentially.

The magnets 72 are either those of the grain boundary diffusion type or those having a residual magnetic flux density Br of 1.3 T or higher, or alternatively those of the grain boundary diffusion type and having a residual magnetic flux density Br of 1.3 T or higher. By using such high-Br magnets, the electric motor 40 can be made smaller and higher-power, but it becomes necessary to suppress the occurrence of magnetic saturation due to the high magnetic flux density of the stator core 43. It is also necessary to suppress the occurrence of demagnetization which will cause property degradation in the electric motor 40.

In this embodiment, therefore, a configuration of the electric motor 40 is devised such that motor efficiency is improved by suppressing the occurrence of demagnetization, and preferably by further suppressing the occurrence of magnetic saturation.

Figure 6:
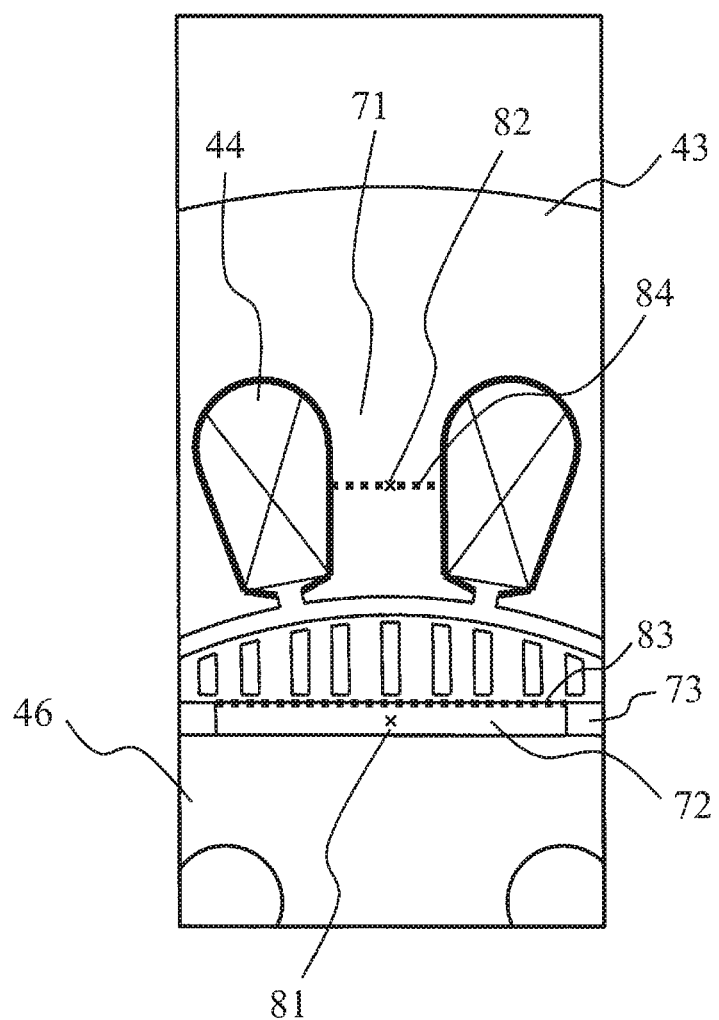
FIG. 6 is a partial cross-sectional view of an electric motor according to the embodiment of the present invention.

FIG. 6 is a partial cross-sectional view of the electric motor 40.

As illustrated in FIG. 6, a state may occur in which the center 81 of one of the magnets 72 and the center 82 of one of the teeth 71 are aligned along the radial direction of the rotor core 46, depending on the rotation angle of the rotor 42. A surface of the one of the magnets 72, the surface facing the one of the teeth 71 (i.e., a surface facing the radially outer side of the rotor core 46), in this state will be called a tooth-facing surface 83 (may also be called simply a "magnet surface" hereinafter). A cross-section of the portion of the one of the teeth 71 where one or more of the windings 44 are wound, the cross-section being parallel to the tooth-facing surface 83 (e.g., a cross-section as a result of cutting at the center 82), will be called a magnet-parallel cross-section 84 (may also be called simply a "tooth cross-section" hereinafter).

Figure 7:
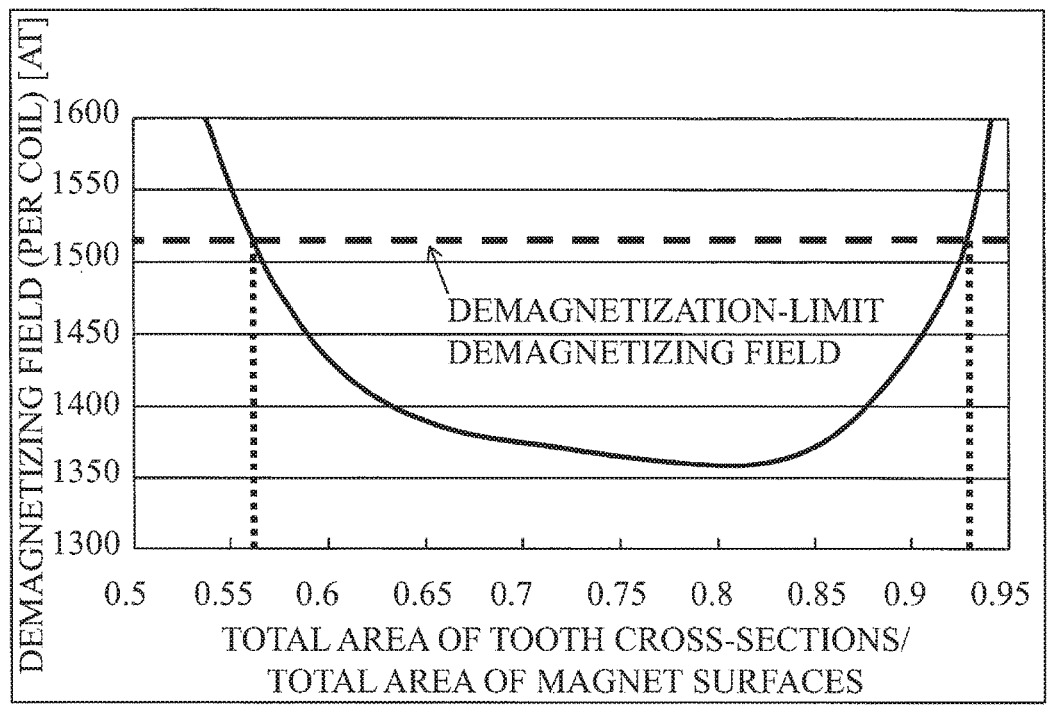
FIG. 7 is a graph illustrating a relationship between the configuration of the electric motor according to the embodiment of the present invention and a demagnetizing field.

FIG. 7 is a graph illustrating a relationship between the configuration of the electric motor 40 and a demagnetizing field.

The graph of FIG. 7 illustrates results of analysis of how the value of the current required for obtaining desired output (a fixed value) from the electric motor 40 changes according to the ratio of the total area of the tooth cross-sections to the total area of the magnet surfaces, when the configuration is such that the number of the teeth 71 is eighteen, six rare-earth magnets (six poles) of the grain boundary diffusion type having a residual magnetic flux density Br of from 1.36 to 1.42 T are used as the magnets 72, and the windings 44 are wound by distributed winding. The value of the current is indicated by being converted into the demagnetizing field (the number of turns of the windings 44×the current flowing in the windings 44).

The electric motor 40 cannot maintain required properties if the magnets 72 are demagnetized. The magnets 72 are demagnetized if the demagnetizing field exceeds a demagnetization-limit demagnetizing field. The magnets 72 with a high residual magnetic flux density Br are particularly prone to demagnetization. The demagnetization-limit demagnetizing field of the magnets 72 used for analysis is 1514 AT (ampere turns).

As can be seen from the results illustrated in FIG. 7, the demagnetizing field can be maintained below the demagnetization-limit demagnetizing field if the total area of the tooth cross-sections (the total area of the magnet-parallel cross-sections 84 of the eighteen teeth 71 formed in the stator core 43) is from 0.56 times to 0.93 times the total area of the magnet surfaces (the total area of the tooth-facing surfaces 83 of the magnets 72 inserted into the six insertion holes 73 formed in the rotor core 46). In this embodiment, therefore, it is assumed that the total area of the tooth cross-sections is from 0.56 times to 0.93 times the total area of the magnet surfaces. With this arrangement, the magnets 72 are less likely to be demagnetized, so that the required properties can be maintained in the electric motor 40.

Figure 8:
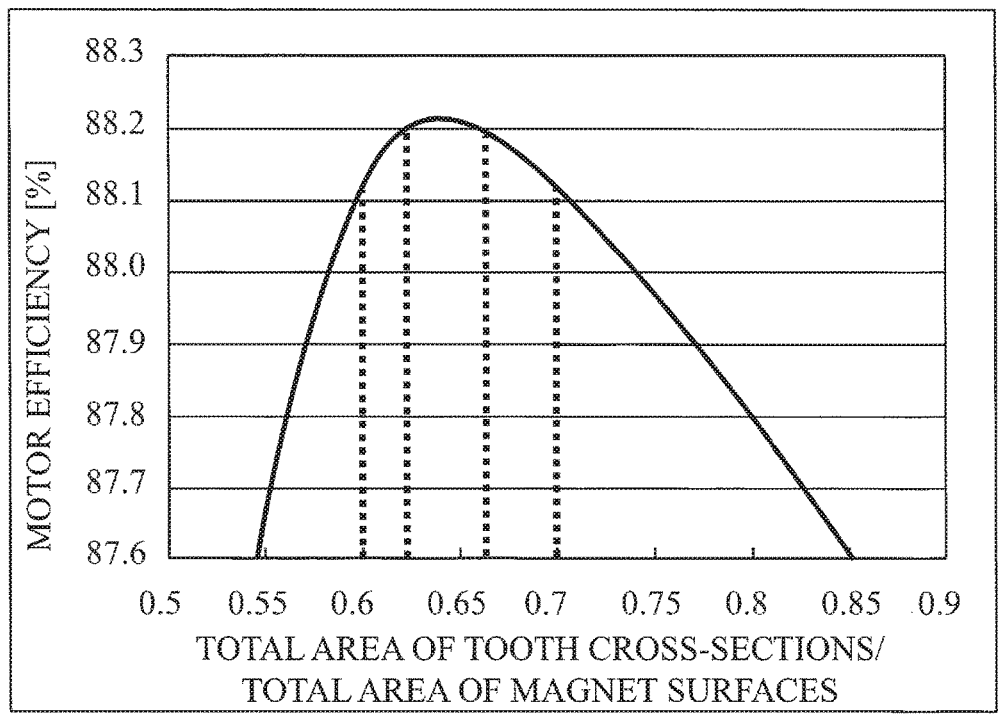
FIG. 8 is a graph illustrating a relationship between the configuration of the electric motor according to the embodiment of the present invention and motor efficiency.
Figure 9:
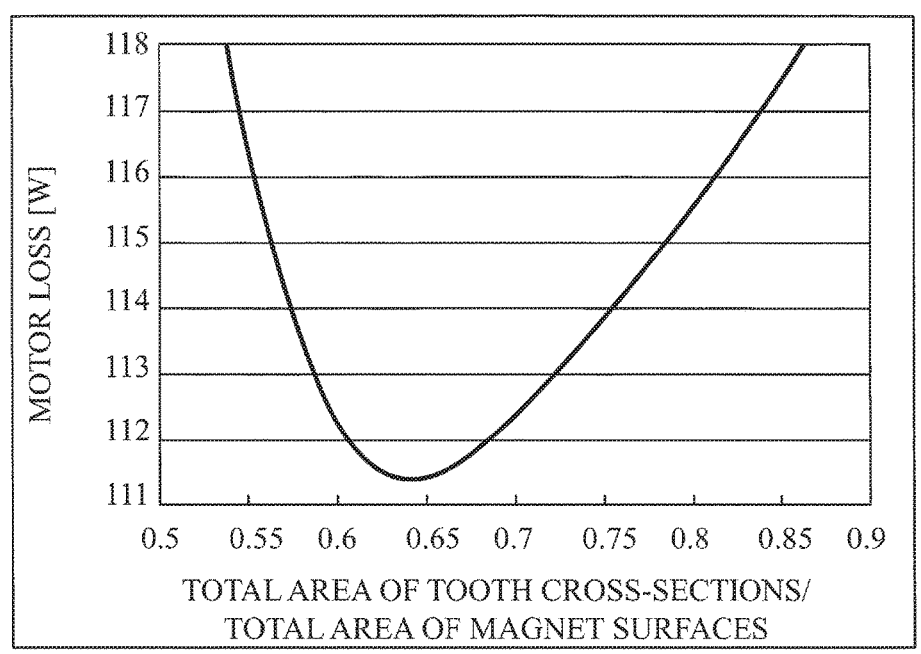
FIG. 9 is a graph illustrating a relationship between the configuration f the electric motor according to the embodiment of the present invention and motor loss.

FIG. 8 is a graph illustrating a relationship between the configuration of the electric motor 40 and motor efficiency. FIG. 9 is a graph illustrating a relationship between the configuration of the electric motor 40 and motor loss.

The graphs of FIGS. 8 and 9 illustrate results of analysis of effects on the motor efficiency and the motor loss, caused by the ratio of the total area of the tooth cross-sections to the total area of the magnet surfaces, when the configuration is such that the number of the teeth 71 is eighteen, six rare-earth magnets (six poles) of the grain boundary diffusion type having a residual magnetic flux density Br of from 1.36 to 1.42 T are used as the magnets 72, and the windings 44 are wound by distributed winding, as in the configuration described above.

In the electric motor 40, magnetic flux saturation which will cause the deterioration of the motor efficiency occurs at the teeth 71 of the stator core 43. The larger the cross-sectional area of the teeth 71, the less likely that magnetic flux saturation will occur. Therefore, if the ratio of the total area of the tooth cross-sections to the total area of the magnet surfaces increases, the motor efficiency increases and the motor loss decreases. However, the larger the cross-sectional area of the teeth 71, the narrower the space (slot) between adjacent ones of the teeth 71, and thus the more the number of turns of the windings 44 is restricted. Therefore, if the ratio of the total area of the tooth cross-sections to the total area of the magnet surfaces increases beyond a certain ratio, the motor efficiency decreases and the motor loss increases.

As can be seen from the results illustrated in FIG. 8, the difference from the maximum efficiency of the motor efficiency can be kept within a range of 0.1% if the total area of the tooth cross-sections (the total area of the magnet-parallel cross-sections 84 of the eighteen teeth 71 formed in the stator core 43) is from 0.6 times to 0.7 times the total area of the magnet surfaces (the total area of the tooth-facing surfaces 83 of the magnets 72 inserted into the six insertion holes 73 formed in the rotor 46). In this embodiment, therefore, it is desirable that the total area of the tooth cross-sections be from 0.6 times to 0.7 times the total area of the magnet surfaces. By employing such a configuration, the electric motor 40 with high efficiency can be realized. Since the occurrence of magnetic saturation is suppressed, the electric motor 40 with low noise can also be realized.

As illustrated in FIGS. 8 and 9, the motor efficiency can be maximized and the motor loss can be minimized if the total area of the tooth cross-sections is from 0.62 times to 0.67 times the total area of the magnet surfaces. In this embodiment, therefore, it is more desirable that the total area of the tooth cross-sections be from 0.62 times to 0.67 times the total area of the magnet surfaces.

The properties as illustrated in FIGS. 7 to 9 can also be obtained if the number of the teeth 71 is changed from eighteen to another number, such as nine, twelve, or thirty six. In this embodiment, therefore, the number of the teeth 71 can be appropriately changed.

The properties as illustrated in FIGS. 7 to 9 can also be obtained if the number of the magnets 72 is changed from six to another number, such as four or nine. In this embodiment, therefore, the number of the magnets 72 can also be appropriately changed.

The properties as illustrated in FIGS. 7 to 9 can also be obtained if the magnets 72 are changed to those of a different type or having a different property (e.g., a different demagnetization-limit demagnetizing field), provided that the magnets have a high residual magnetic flux density Br. In this embodiment, therefore, the magnets 72 themselves may be appropriately changed to other high-Br magnets.

The windings 44 may be wound around the teeth 71 by concentrated winding, not being limited to distributed winding.

According to this embodiment, the quality of the electric motor 40 using the magnets 72 having a high residual magnetic flux density Br can be secured.

By applying the electric motor 40 to the compressor 12, the compressor 12 at low cost and with low noise and high quality while satisfying predetermined efficiency can be obtained.

Furthermore, by applying the compressor 12 to the refrigerating cycle apparatus 10, the refrigerating cycle apparatus 10 with high reliability can be obtained.

The embodiment of the present invention has been described above. This embodiment may be partially implemented. For example, among those each described as "portion" in the description of the embodiment, only one may be employed, or an arbitrary combination of some may be employed. The present invention is not limited to this embodiment, and various modifications may be made as needed.

REFERENCE SIGNS LIST

10: refrigerating cycle apparatus; 11a, 11b: refrigerant circuit; 12: compressor; 13: four-way valve; 14: outdoor heat exchanger; 15: expansion valve; 16: indoor heat exchanger; 17: control device; 20: hermetic container; 21: suction pipe; 22: discharge pipe; 23: suction muffler; 24: terminal; 25: refrigerating machine oil; 30: compressing element; 31: cylinder; 32: rolling piston; 33: main bearing; 34: auxiliary bearing; 35: discharge muffler; 36: vane; 37: vane spring; 40: electric motor; 41: stator; 42: rotor; 43: stator core; 44: winding; 45: lead wire; 46: rotor core; 47: insulating member; 48: upper end plate; 49: lower end plate; 50: crank shaft; 51: eccentric shaft portion; 52: main shaft portion; 53: auxiliary shaft portion; 61: vane groove; 62: cylinder chamber; 63: back-pressure chamber; 71: tooth; 72: magnet; 73: insertion hole; 74: shaft hole; 75: through hole; 81: center; 82: center; 83: tooth-facing surface; 84: magnet-parallel cross-section

The invention claimed is:

1. An electric motor comprising:
   a rotor having magnets of a grain boundary diffusion type and a rotor core in which insertion holes, into which the magnets are inserted, are formed circumferentially; and
   a stator having windings and a stator core in which teeth, around which the windings are wound, are formed circumferentially,
   wherein in a state in which a center of one of the magnets and a center of one of the teeth are aligned along a radial direction of the rotor core, a surface of the one of the magnets, the surface facing the one of the teeth, is defined as a tooth-facing surface, and a cross-section of a portion of the one of the teeth where one or more of the windings are wound, the cross-section being parallel to the tooth-facing surface, is defined as a magnet-parallel cross-section, and a total area of magnet-parallel cross-sections of the teeth formed in the stator core is from 0.56 times to 0.93 times a total area of tooth-facing surfaces of the magnets inserted into the insertion holes formed in the rotor core.

2. The electric motor according to claim 1, wherein the total area of the magnet-parallel cross-sections of the teeth formed in the stator core is from 0.6 times to 0.7 times the total area of the tooth-facing surfaces of the magnets inserted into the insertion holes formed in the rotor core.

3. A compressor comprising:
   the electric motor according to claim 2; and
   a compressing element to compress a refrigerant by being driven by the electric motor.

4. A refrigerating cycle apparatus comprising a refrigerant circuit to which the compressor according to claim 3 is connected and in which the refrigerant circulates.

5. The electric motor according to claim 1, wherein the total area of the magnet-parallel cross-sections of the teeth formed in the stator core is from 0.62 times to 0.67 times the total area of the tooth-facing surfaces of the magnets inserted into the insertion holes formed in the rotor core.

6. A compressor comprising:
   the electric motor according to claim 5; and
   a compressing element to compress a refrigerant by being driven by the electric motor.

7. A refrigerating cycle apparatus comprising a refrigerant circuit to which the compressor according to claim 6 is connected and in which the refrigerant circulates.

8. A compressor comprising:
   the electric motor according to claim 1; and
   a compressing element to compress a refrigerant by being driven by the electric motor.

9. A refrigerating cycle apparatus comprising a refrigerant circuit to which the compressor according to claim 8 is connected and in which the refrigerant circulates.

10. An electric motor comprising:
    a rotor having magnets with a residual magnetic flux density of 1.3 teslas or higher and a rotor core in which insertion holes, into which the magnets are inserted, are formed circumferentially; and
    a stator having windings and a stator core in which teeth, around which the windings are wound, are formed circumferentially,
    wherein in a state in which a center of one of the magnets and a center of one of the teeth are aligned along a radial direction of the rotor core, a surface of the one of the magnets, the surface facing the one of the teeth, is defined as a tooth-facing surface, and a cross-section of a portion of the one of the teeth where one or more of the windings are wound, the cross-section being parallel to the tooth-facing surface, is defined as a magnet-parallel cross-section, and a total area of magnet-parallel cross-sections of the teeth formed in the stator core is from 0.56 times to 0.93 times a total area of tooth-facing surfaces of the magnets inserted into the insertion holes formed in the rotor core.

11. The electric motor according to claim 10, wherein the total area of the magnet-parallel cross-sections of the teeth formed in the stator core is from 0.6 times to 0.7 times the total area of the tooth-facing surfaces of the magnets inserted into the insertion holes formed in the rotor core.

12. A compressor comprising:
    the electric motor according to claim 11; and
    a compressing element to compress a refrigerant by being driven by the electric motor.

13. A refrigerating cycle apparatus comprising a refrigerant circuit to which the compressor according to claim 12 is connected and in which the refrigerant circulates.

14. The electric motor according to claim 10, wherein the total area of the magnet-parallel cross-sections of the teeth formed in the stator core is from 0.62 times to 0.67 times the total area of the tooth-facing surfaces of the magnets inserted into the insertion holes formed in the rotor core.

15. A compressor comprising:
    the electric motor according to claim 14; and
    a compressing element to compress a refrigerant by being driven by the electric motor.

16. A refrigerating cycle apparatus comprising a refrigerant circuit to which the compressor according to claim 15 is connected and in which the refrigerant circulates.

17. A compressor comprising:
    the electric motor according to claim 10; and
    a compressing element to compress a refrigerant by being driven by the electric motor.

18. A refrigerating cycle apparatus comprising a refrigerant circuit to which the compressor according to claim 17 is connected and in which the refrigerant circulates.

* * * * *